US012753559B2

(12) United States Patent
Zamir Peer

(10) Patent No.: US 12,753,559 B2
(45) Date of Patent: Oct. 6, 2026

(54) DOG WASTE COLLECTOR

(71) Applicant: Einat Zamir Peer, Yavne (IL)

(72) Inventor: Einat Zamir Peer, Yavne (IL)

( * ) Notice: Subject to any disclaimer, the term of this patent is extended or adjusted under 35 U.S.C. 154(b) by 831 days.

(21) Appl. No.: 18/130,458

(22) Filed: Apr. 4, 2023

(65) Prior Publication Data

US 2024/0328102 A1 Oct. 3, 2024

(30) Foreign Application Priority Data

Apr. 2, 2023 (IL) .......................................... 301885

(51) Int. Cl.
*E01H 1/12* (2006.01)
*A01K 27/00* (2006.01)

(52) U.S. Cl.
CPC ......... *E01H 1/1206* (2013.01); *A01K 27/004* (2013.01); *E01H 2001/1273* (2013.01); *E01H 2001/128* (2013.01)

(58) Field of Classification Search
CPC ....... E01H 1/12; E01H 1/1206; A01K 27/004; A01K 23/005
See application file for complete search history.

(56) References Cited

U.S. PATENT DOCUMENTS 8,939,481 B1 * 1/2015 Qi .......................... E01H 1/1206 294/1.4
9,469,951 B1 * 10/2016 Qi .......................... E01H 1/1206
10,548,297 B2 * 2/2020 Weatherly ............. E01H 1/1206
10,709,112 B1 * 7/2020 Times-Dudley ..... A01K 23/005
10,801,171 B1 * 10/2020 McCormick .......... E01H 1/1206
2023/0304240 A1 * 9/2023 Radut ................... E01H 1/1206

* cited by examiner

*Primary Examiner* — Sang K Kim

(57) ABSTRACT

A device is configured for collecting dog waste. The device may include a grip handle and/or a telescopic arm attached at a proximal end thereof to the grip handle and at a distal end thereof to claw. The blades are optionally configured to be opened and closed responsive to activation of a trigger mechanism. The claw may include magnets which attract a magnetic material arranged around the rim of dog waste collection bag. The magnetic material may include ceramics, metals, and neodymium, among other magnetic materials. The waste collection bags may include nylon, polypropylene, among other suitable materials.

16 Claims, 18 Drawing Sheets

DOG WASTE COLLECTOR

FIELD OF THE INVENTION

The present invention relates to pet accessories in general, and more particularly to a dog waste collector.

BACKGROUND TO THE INVENTION

In many countries dogs of different types are bred. Generally, the user goes out with his dog for a walk to allow the dog to defecate during the walk. According to existing regulations and laws in many countries, the dog owner must collect the dog's waste.

Dog waste collection is done in different ways, for example, using plastic bags or other different devices and collection tools. Since the collection with bags made of nylon or other materials is done when the bag is with its opening proximal to the floor, it is a problem to keep the bag closed after collecting the waste. Additionally, there is also a problem to attach the bag to a collection shovel prior to collection and to afterwards easily detach the bag from the shovel. There is also a problem to remotely operate the collection shovel easily without the user having to touch it.

Therefore, there is a need for a dog waste collector which is configured to collect the waste in a bag with its opening proximal to the floor, to seal the bag once the waste has been collected, and to easily detach the sealed bag for disposal, without the user having to touch the waste and/or the bag.

SUMMARY OF THE INVENTION

According to an aspect of some embodiments of the invention, there is provided a device for collecting dog waste, including: a grip handle; and a rod with a proximal portion of the rod attached to the grip handle; a claw attached to distal portion of the rod; wherein the claw is configured to be opened and closed responsive to activation of a trigger mechanism positioned on the grip handle.

According to some embodiments of the invention, the rod is telescopic.

According to some embodiments of the invention, the claw includes claw.

According to some embodiments of the invention, the claw include one or more heating elements configured to heat seal a rim of the bag following collection of the waste.

According to some embodiments of the invention, the heating elements are located at an edge of each shovel blade.

According to some embodiments of the invention, the heating elements are powered by a DC source.

According to some embodiments of the invention, the claw wherein the claw comprise magnets which attract a magnetic material arranged around a rim of a dog waste collection bag.

According to some embodiments of the invention, the magnetic material is a ceramic, a metal, or combinations thereof.

According to some embodiments of the invention, the device further includes a bag dispenser.

According to some embodiments of the invention, the bag dispenser is configured to dispense a dog waste collection bag, wherein the dog waste collection bag is a plastic bag or a foldable strip of plastic from a long roll of plastic.

According to some embodiments of the invention, the dog waste collection bag is composed of nylon, polypropylene, polyethylene, or combinations thereof.

According to some embodiments of the invention, the telescopic rod includes at least one extendable section which are secured in place by a locking means.

According to some embodiments of the invention, the grip handle further includes a leash attachable to a collar of a dog.

According to some embodiments of the invention, the leash is retractable.

According to an aspect of some embodiments of the invention, there is provided a method for collecting dog waste, including: positioning a dog waste collecting device over the waste, wherein the dog waste collection device includes: a grip handle; and a rod attached to the grip handle at a proximal end and to a claw at a distal end, wherein the claw are configured to be opened and closed responsive to activating a trigger mechanism positioned on the grip handle; and opening the claw with a rim of a dog waste collection bag attached to the claw; operating a trigger mechanism to close the claw over the waste, thereby collecting the waste inside the dog waste collection bag; sealing the dog waste collection bag; and disposing of the sealed dog waste collection bag inside a waste container by opening the claw.

According to some embodiments of the invention, the rod is telescopic.

According to some embodiments of the invention, the sealing is by one or more heating elements located at the edge of each shovel blade configured to heat seal the rim of the dog waste collection bag following collection of the waste.

According to some embodiments of the invention, the sealing is sealing the rim of the dog waste collection bag together by the attraction of magnetic material inside the rim of the dog waste collection bag.

According to some embodiments of the invention, the activating is mechanical or electronic.

According to some embodiments of the invention, the attaching the dog waste collection bag to the claw is by dispensing from a bag dispenser.

According to some embodiments of the invention, the bag dispenser is configured to dispense a dog waste collection bag, wherein the dog waste collection bag is a plastic bag or a foldable strip of plastic from a long roll of plastic.

According to some embodiments of the invention, the positioning includes extending at least one extendable section of the telescopic rod and securing the at least one extended section in place by a locking means.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

Figure 1:
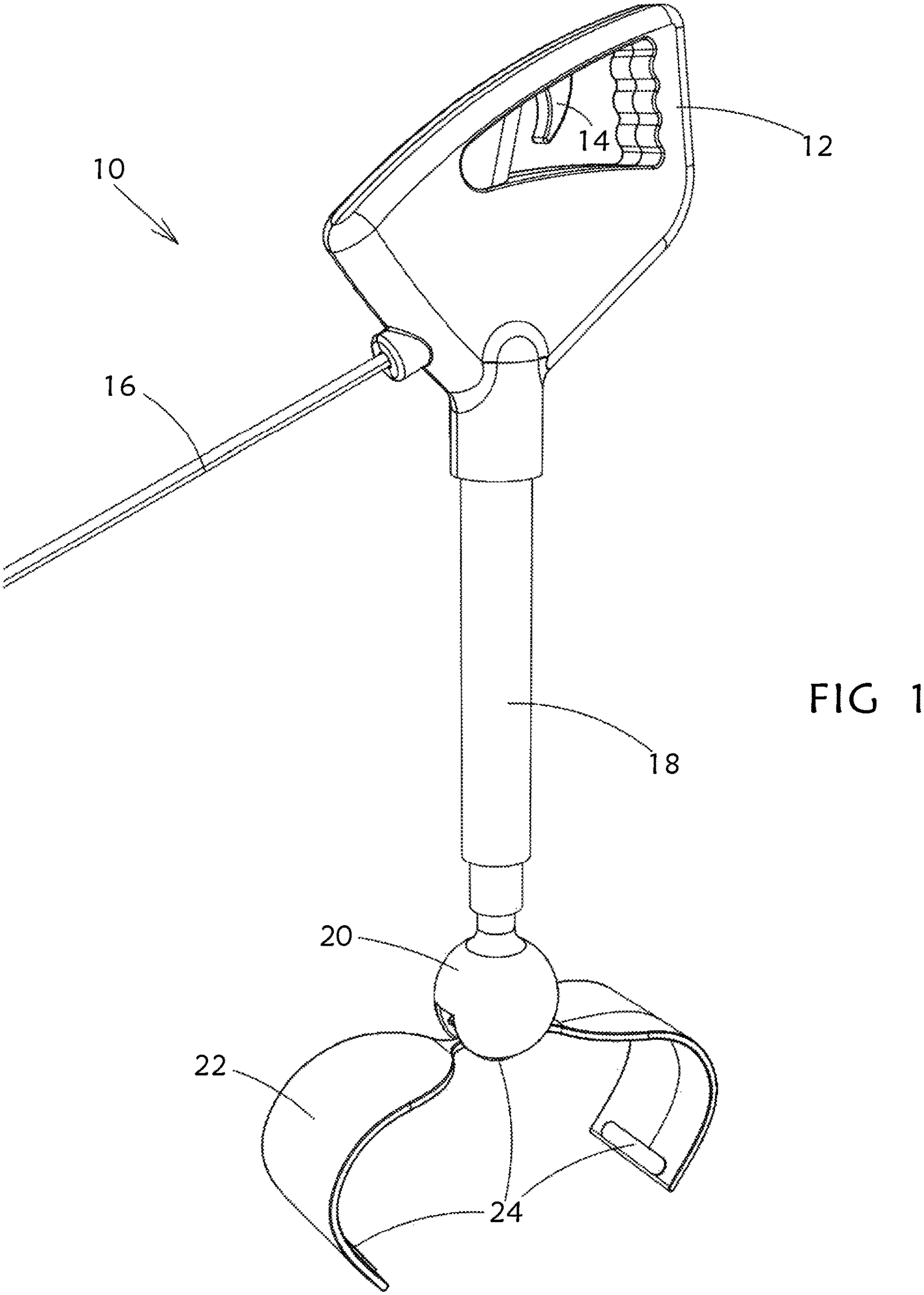
FIG. 1: Schematic illustration of an exemplary dog waste collector in an open configuration, according to an embodiment of the present invention.

The present invention relates to pet accessories in general, and more particularly to a dog waste collector.

Overview

An aspect of the present invention relates to device for collecting dog waste which includes a grip handle and a telescopic arm attached to the grip handle at a proximal end and to shovel blades at a distal end, the blades configured to be opened and closed responsive to activation of a trigger mechanism and including magnets which attract a magnetic material arranged around the rim of dog waste collection bag. The magnetic material may include ceramics, metals, and neodymium, among other magnetic materials. The waste collection bags may include nylon, polypropylene, among other suitable materials.

In operation, the device may be placed over the waste with the shovel blades open and with the rim of the bag attached to the blades by the attraction of the magnets. A user may then approximate the blades to the waste and may operate a trigger mechanism to close the blades over the waste, collecting the waste inside the bag. The rim of the bag may be sealed together by the attraction of the magnetic material inside the rim, allowing the user to dispose of the sealed bag inside a waste container by opening the shovel blades.

In some embodiments, the shovel blades may additionally include one or more heating elements which may be used to heat seal the rim of the bag following collection of the waste. The heating elements may be located at the edge of each shovel blade and may be powered by a DC source which may include batteries.

In some embodiments, the device may include a leash which may be attached to a collar of the dog. The leash, which may be retractable, may include a cable or other suitable material. The device may include a retrieving mechanism in the grip housing which may retrieve the leash into the housing.

Some embodiments of the device of the present invention may be particularly advantageous in that it may allow a user to collect a pet dog's waste and dispose of it in a waste container without having to manually contact the waste collection bag, thereby contributing to maintaining a clean and healthy environment. An aspect of the present invention relates to device for collecting dog waste which may include a grip handle including a grip housing and a telescopic rod attached to the grip housing at a proximal end and to jaws including shovel blades at a distal end. Optionally, the shovel blades may be configured to move between an open configuration and a closed configuration in response to activation of a trigger mechanism. Optionally, the trigger mechanism may be located on the handle. Optionally, the trigger mechanism may be mechanical and/or electronic.

According to some embodiments, the trigger mechanism may activate an electrical system and/or an actuator which may open and close the blades. Optionally, the trigger mechanism may activate an electrical system and/or an actuator which may load a bag and/or a roll of plastic.

According to some embodiments, the trigger mechanism may mechanically open and close the blades. Optionally, a bag may be loaded manually.

According to some embodiments, the handle may include a leash which may be attached to a collar of the dog. Optionally, the leash may be retractable. Optionally, the leash may include a cable and/or other suitable material. Optionally, the device may include a retrieving mechanism in the grip handle which may retrieve the leash into the housing.

According to some embodiments, the handle may be connected to the proximal end of a telescopic rod. Optionally, the telescopic rod may be retracted (e.g., for storage, when not in use, for convenience, etc.) and/or extended (e.g., when in use such that the user does not need to bend down). Optionally, the telescopic rod may include one or more extendable sections, which may be secured in place by a locking means. Optionally, the telescopic rod may be extended manually, mechanically and/or electronically to the required length. Optionally, the distal end of a telescopic rod may be connected to the jaws.

According to some embodiments, the jaw may include shovel blades. Optionally, the jaw may be mechanically and/or electronically operated on triggering by a trigger mechanism. According to some embodiments, the jaws may include a bag dispenser. Optionally, a waste collection bag may be self-loading.

According to some embodiments, a waste collection bag may be a plastic bag. Optionally, the plastic bag may be fitted to the jaws. Optionally, the mouth of the plastic bag may be stretched open by the shovel blades when in the open configuration. Optionally, the waste may be enclosed by the plastic bag.

According to some embodiments, a waste collection bag may be a long roll of plastic. Optionally, a strip of plastic from a long roll of plastic may be stretched between the shovel blades when in the open configuration. Optionally, the roll of plastic may be folded over the waste.

According to some embodiments, the bag may be sealed, e.g., by heat, adhesive, magnets, etc. and/or any combination thereof. Optionally, the waste collection bags may include nylon, polypropylene, polyethylene, among other suitable materials, and/or combinations thereof.

According to some embodiments, the shovel blades may include one or more heating elements, which may be used to heat seal the rim of the bag following collection of the waste. Optionally, the heating elements may cut and/or seal a strip of plastic from a long roll of plastic. Optionally, the heating elements may be located at the edge of each shovel blade. Optionally, the heating elements may be powered by a DC source, which may include batteries.

Alternatively, and/or additionally, in some embodiments, the blades may include magnets, which may attract a magnetic material arranged around the rim of a dog waste collection bag. Optionally, the magnetic material may include ceramics, metals, neodymium, among other magnetic materials, and/or combinations thereof.

According to some embodiments, while in operation, the device may be placed over the waste with the shovel blades open and with the rim of the bag attached to the blades by the attraction of the magnets. Optionally, a user may then approximate the blades to the waste and may operate a trigger mechanism to close the blades over the waste, collecting the waste inside the bag. Optionally, the rim of the bag may be sealed together by the attraction of the magnetic material inside the rim, which may facilitate disposal of the sealed bag inside a waste container by opening the shovel blades.

In some embodiments, the device may be particularly advantageous in that it may allow a user to collect a pet dog's waste and dispose of it in a waste container without having to manually contact the waste collection bag, thereby contributing to maintaining a clean and healthy environment.

Specific Embodiments

The present invention will now be described in terms of specific example embodiments. It is to be understood that the invention is not limited to the example embodiments disclosed. It should also be understood that not every feature of the methods and systems described are necessary to implement the invention as claimed in any particular one of the appended claims. Various elements and features of the invented article are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to the figures.

FIG. 1 schematically illustrates an exemplary dog waste collector in an open configuration, according to an embodiment of the present invention. For example, shown in the figure is the collector (10) in the open configuration. The collector (10) includes a grip handle (12) with a trigger (14) used to operate the device, a leash (16), optionally a cable, which is attachable to a dog collar, and a retracted telescopic rod (18) which includes at its distal end a collection mechanism (20) including collection shovel blades (22), and optionally magnets (24) and/or heating elements (not shown).

Figure 2:
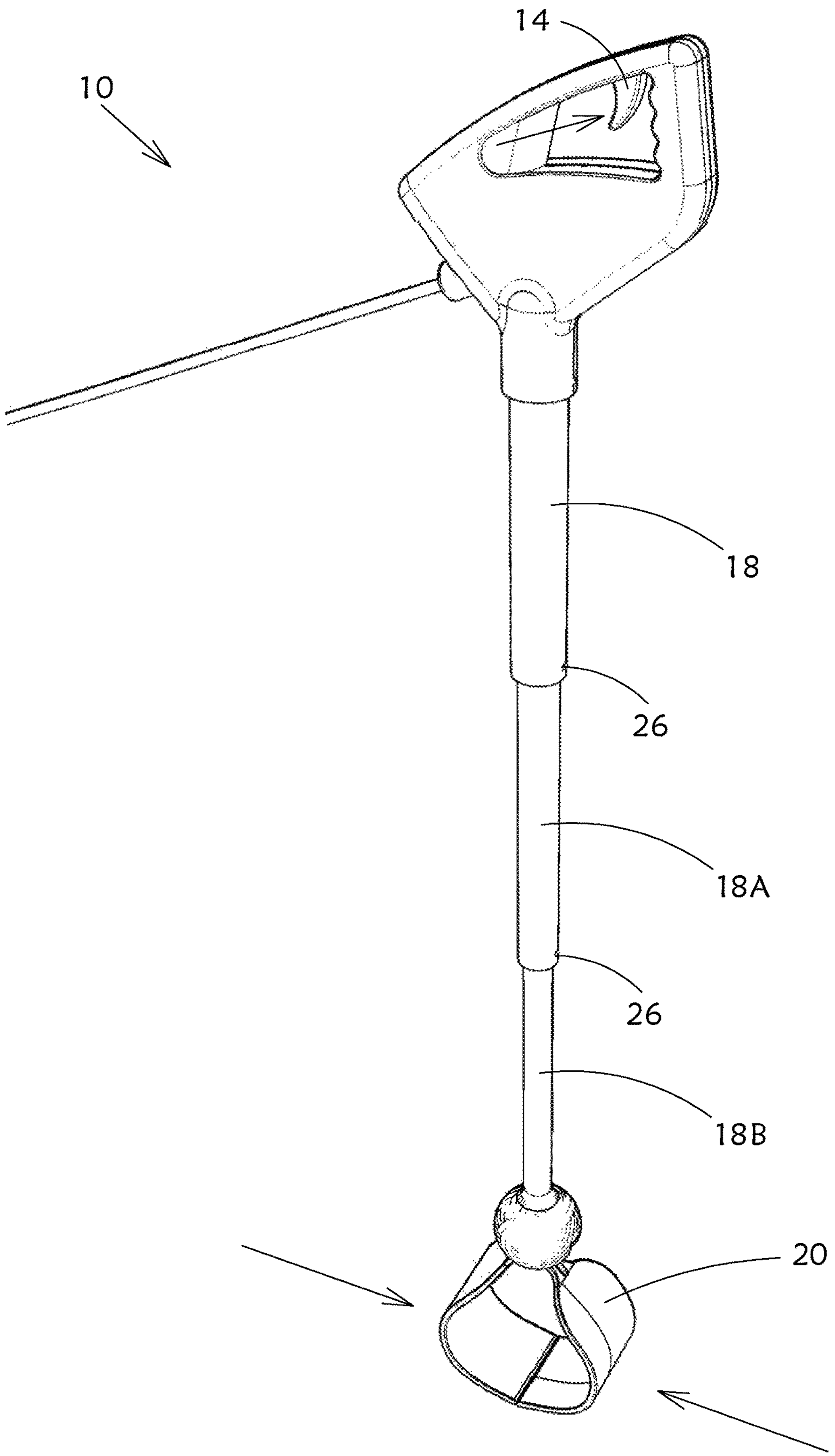
FIG. 2: Schematic illustration of an exemplary dog waste collector in a closed configuration, according to an embodiment of the present invention.

FIG. 2 schematically illustrates the exemplary dog waste collector in a closed configuration, according to an embodiment of the present invention. For example, shown in the figure is the collector (10) in the closed configuration, e.g., prior to and/or following collecting dog waste. The telescopic rod (18) includes two extendable sections (18A, 18B) which may be secured in place by a locking means (26). Pressing trigger (14) closes the shovel blades (22) in collection mechanism (20).

Figure 3:
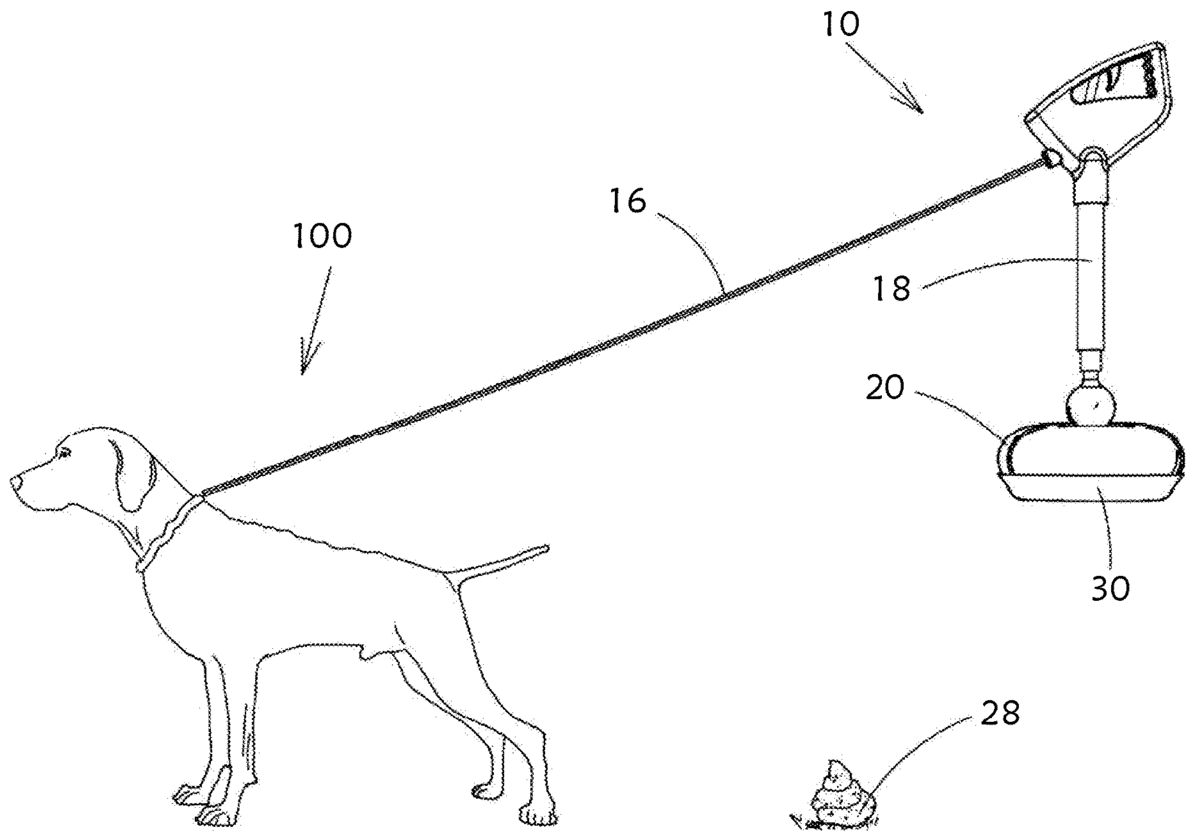
FIG. 3: Schematic illustration of an exemplary dog waste collector, according to an embodiment of the present invention.

FIG. 3 schematically the exemplary dog waste collector, according to an embodiment of the present invention. For example, shown in the figure is the collector (10) with the leash (16) attached to the collar of a dog (100) and with the telescopic rod (18) in a retracted state. The shovel blades (22) are shown with a bag (30) which is used to collect the dog waste (28) stretched between the shovel blades (22).

Figure 4:
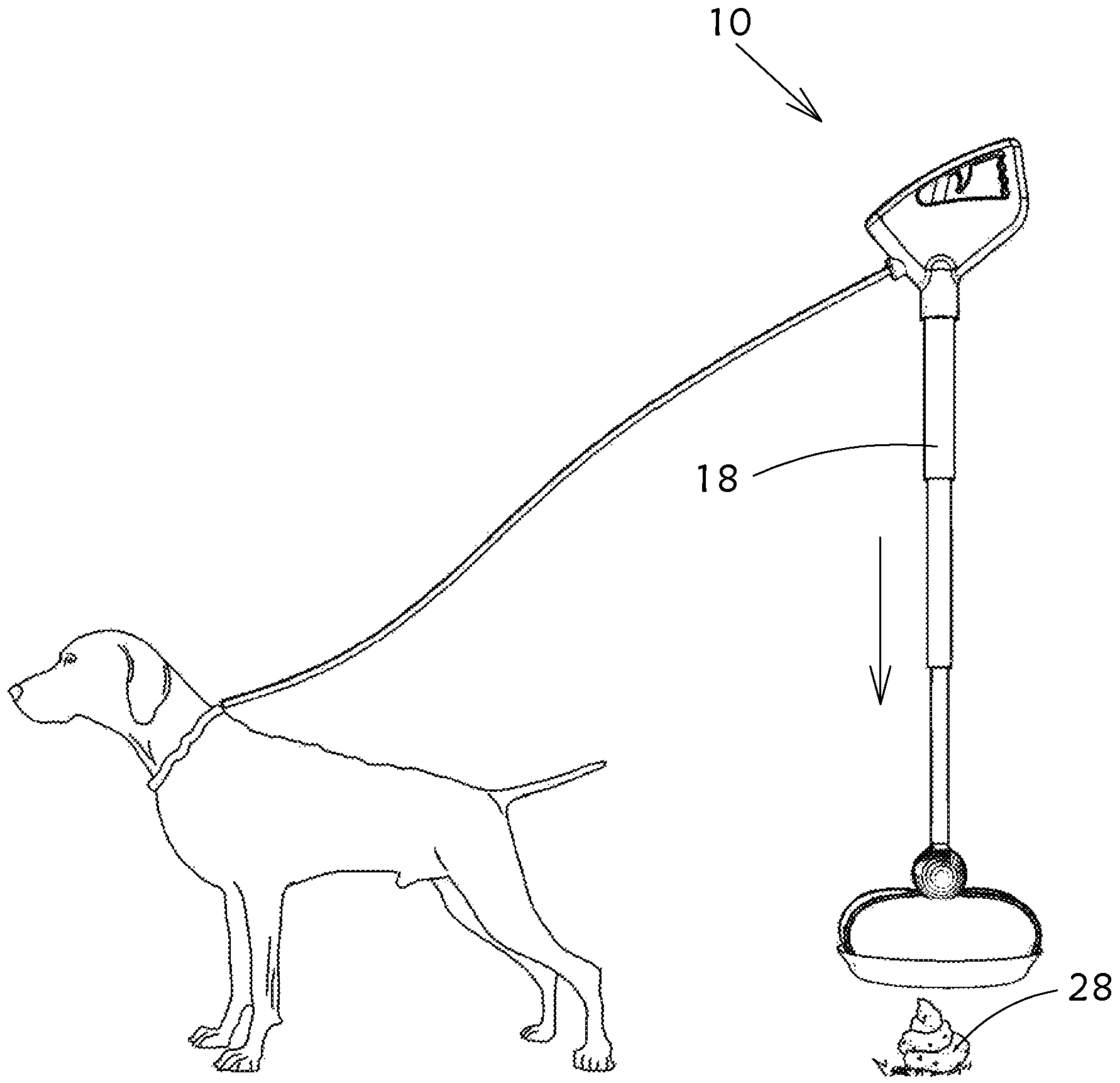
FIG. 4: Schematic illustration of an exemplary dog waste collector, according to an embodiment of the present invention.

FIG. 4 schematically illustrates the exemplary dog waste collector, according to an embodiment of the present invention. For example, shown in the figure is the collector (10) with the telescopic rod (18) extended is placed with the shovel blades (22) open with the bag between them above the dog waste (28).

Figure 5:
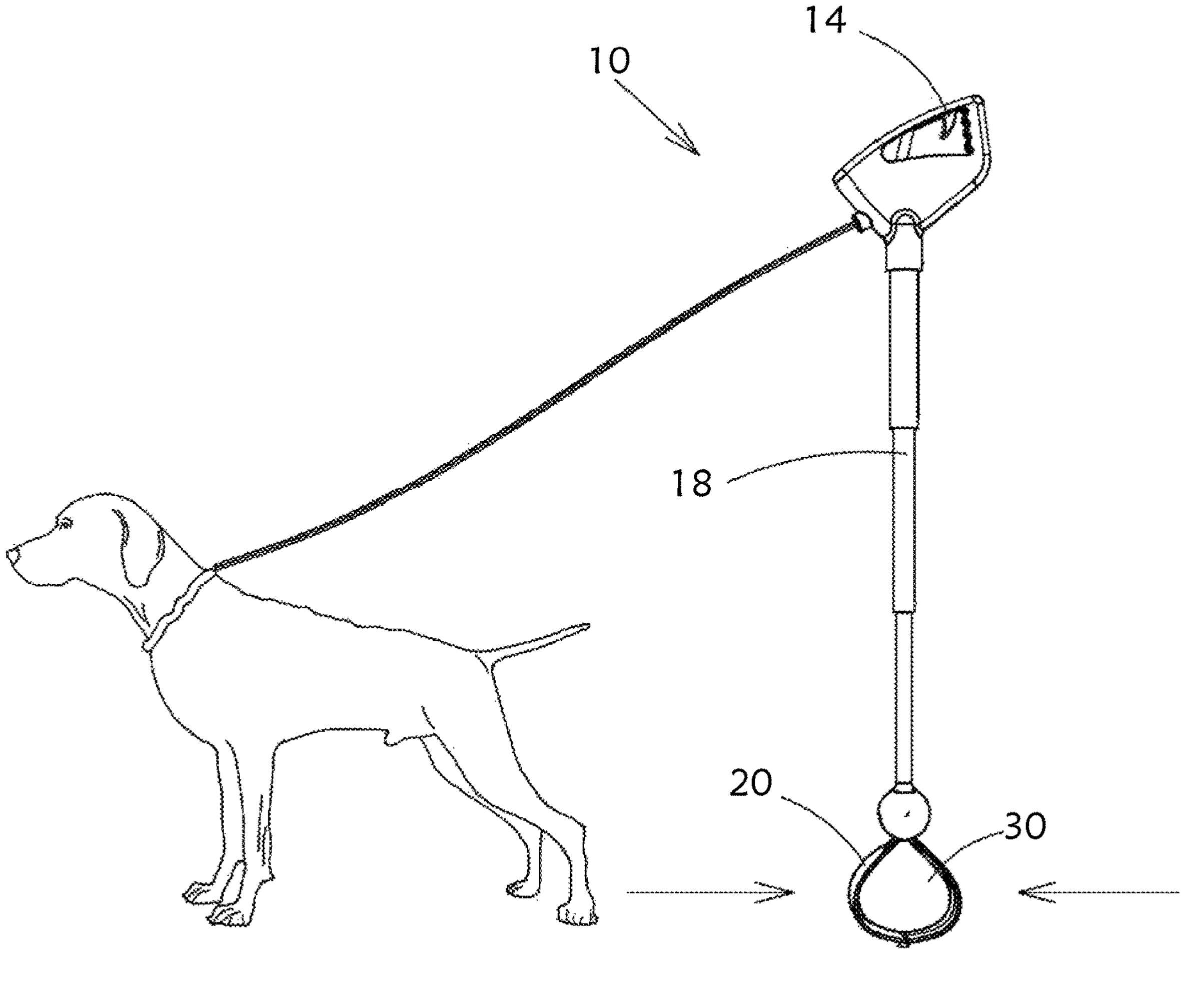
FIG. 5: Schematic illustration of an exemplary dog waste collector, according to an embodiment of the present invention.

FIG. 5 schematically illustrates the exemplary dog waste collector, according to an embodiment of the present invention. For example, shown in the figure is the collector (10) following pressing of a trigger mechanism (14) and the shovel blades (22) closing over the dog waste, which is collected inside the bag (30).

Figure 6:
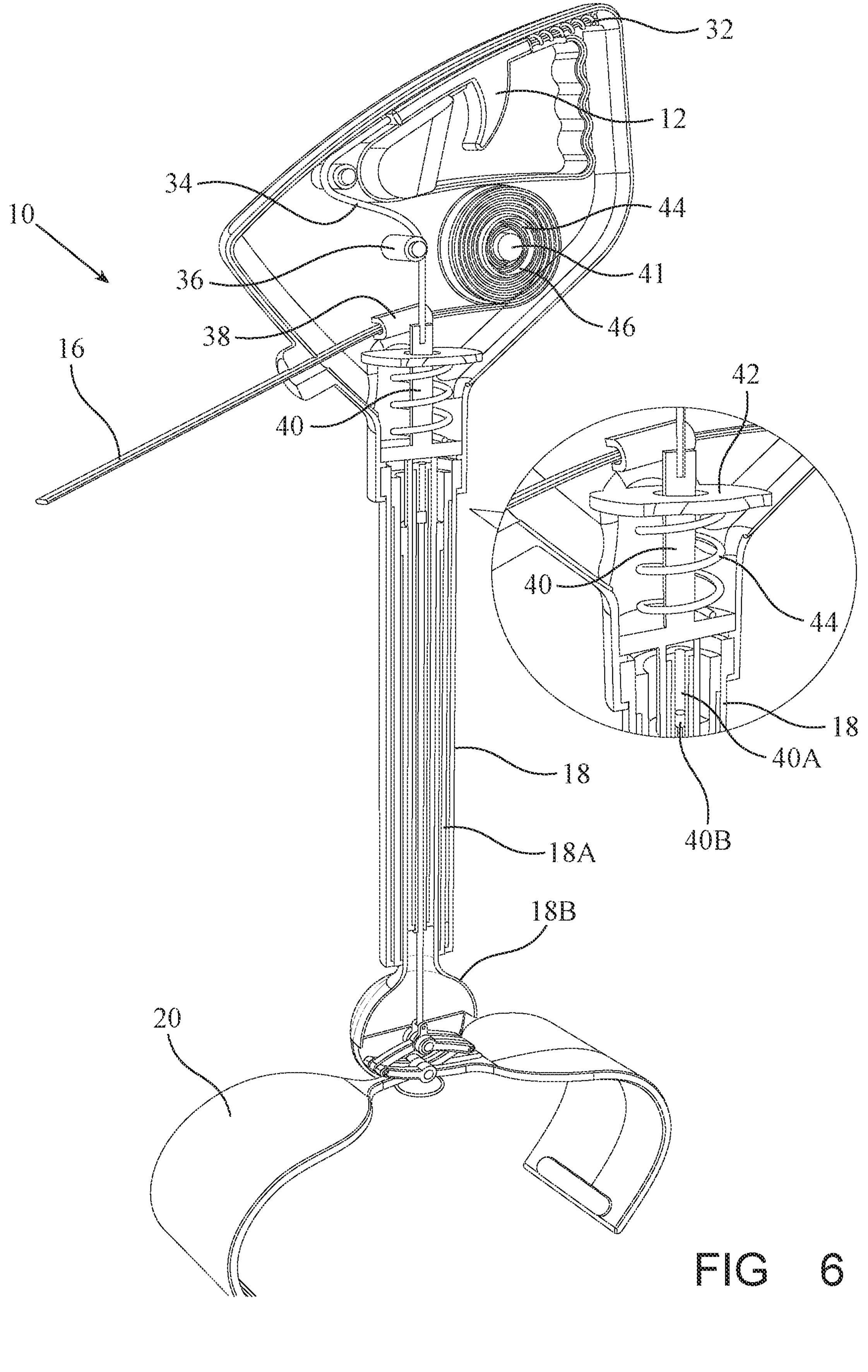
FIG. 6: Schematic illustration of an exemplary dog waste collector, according to an embodiment of the present invention.

FIG. 6 schematically illustrates the exemplary dog waste collector, according to an embodiment of the present invention. For example, shown in the figure are various parts of the collector (10) in an operational mode when the collector is in the open configuration. The trigger (14) is attached on one side to a spring (32), and on the other side to a cable (34) which is guided by a wheel (36) for ease of movement and is connected to the head of an inner rod (40). The inner rod is pushed by a spring (44) which is supported against a counter surface (42) which is integral with the grip handle. Also shown is the telescopic rod (18) with the extendable sections (18A, 18B), the extendable sections including inner extendable rods (40A, 40B), and the open shovel blades (22). Additionally shown is the leash (16) which passes through a guide (38) and is rolled onto a drum which rotates on an axis (41) assisted by a spring (46) and serves to gather the leash.

Figure 7:
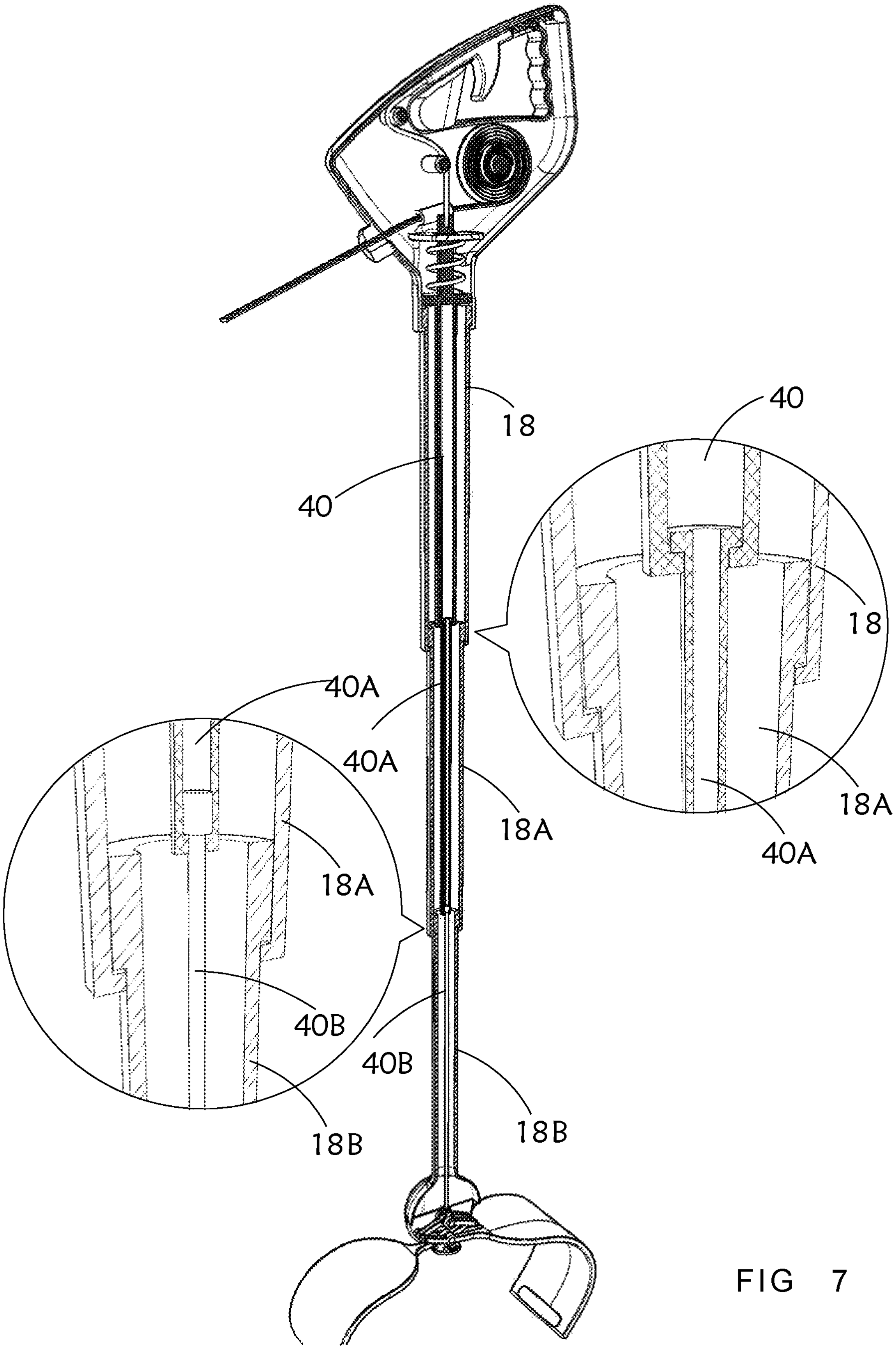
FIG. 7: Schematic illustration of an exemplary dog waste collector, according to an embodiment of the present invention.

FIG. 7 schematically illustrates the exemplary dog waste collector, according to an embodiment of the present invention. For example, shown in the figure is the telescopic rod (18) with extendable sections (18A, 18B) in an open configuration, and therewithin the inner rod (40) including an inner extendable rod (40A, 40B) also in the open configuration. The expanded views are exemplary schematic images showing the connections between the extendable sections and the rods.

Figure 8:
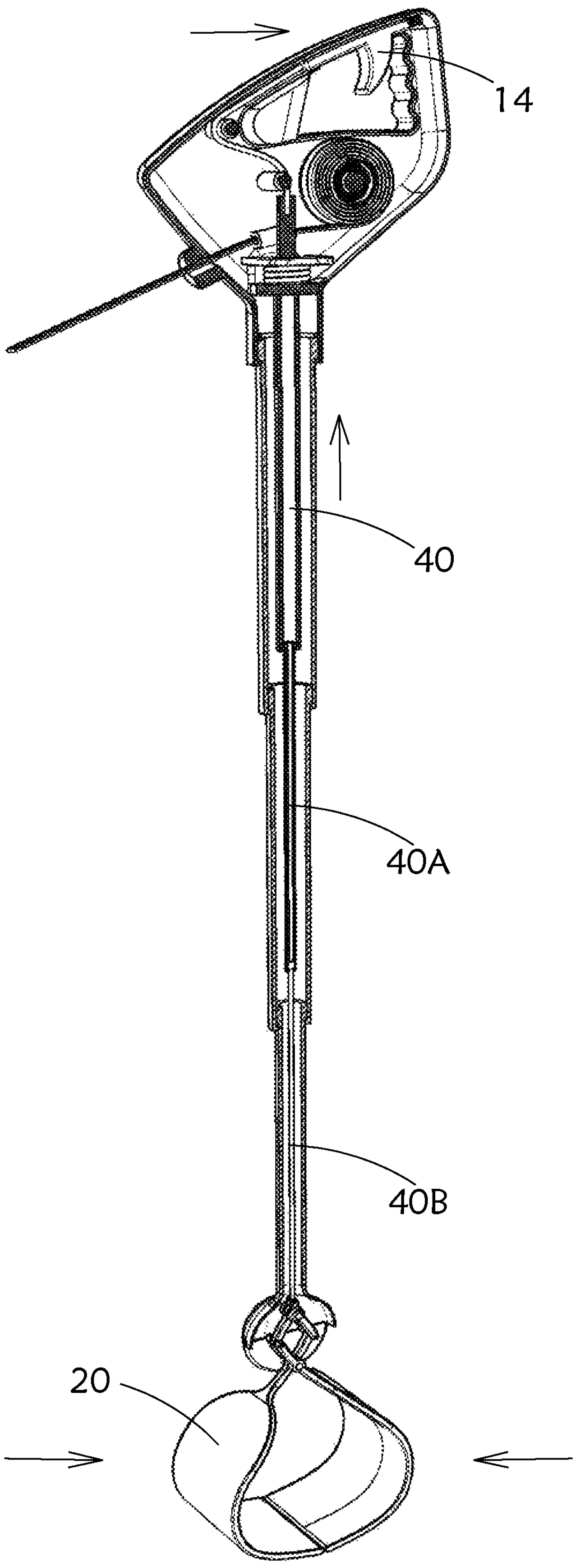
FIG. 8: Schematic illustration of an exemplary dog waste collector, according to an embodiment of the present invention.

FIG. 8 schematically illustrates the exemplary dog waste collector, according to an embodiment of the present invention. For example, shown in the figure is the waste collector in the closed configuration. Pressing of the trigger (14) retracts the inner rod (40) which retracts the extendable rod (40A) and extendable rod (40B), closing the shovel blades (22).

Figure 9:
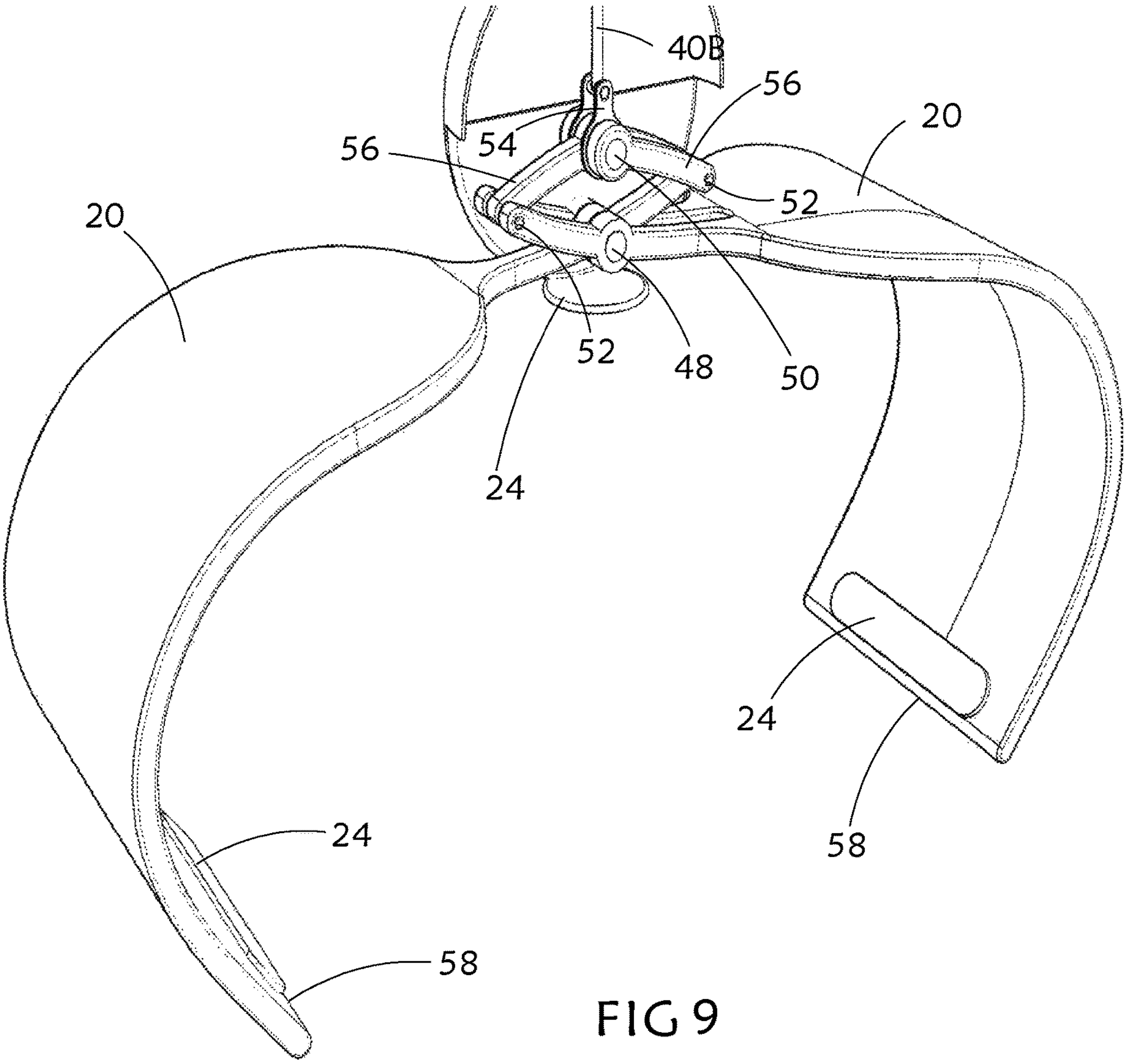
FIG. 9: Schematic illustration of an exemplary dog waste collector, according to an embodiment of the present invention.

FIG. 9 schematically illustrates the exemplary dog waste collector, according to an embodiment of the present invention. For example, shown in the figure is the collection mechanism in the open configuration. A distal end of the inner rod (40B) is attached by an element (54) to a hinge (50) to which are also attached arms (56) attached by a hinge (52) to the collection mechanism (20). The shovel blades (22) are attached together by a hinge (48). The shovel blades (22) include magnets (24) for collecting plastic bags with metallic components and a heating element (58) at the edge of the blades to heat seal the bags closed.

Figure 10:
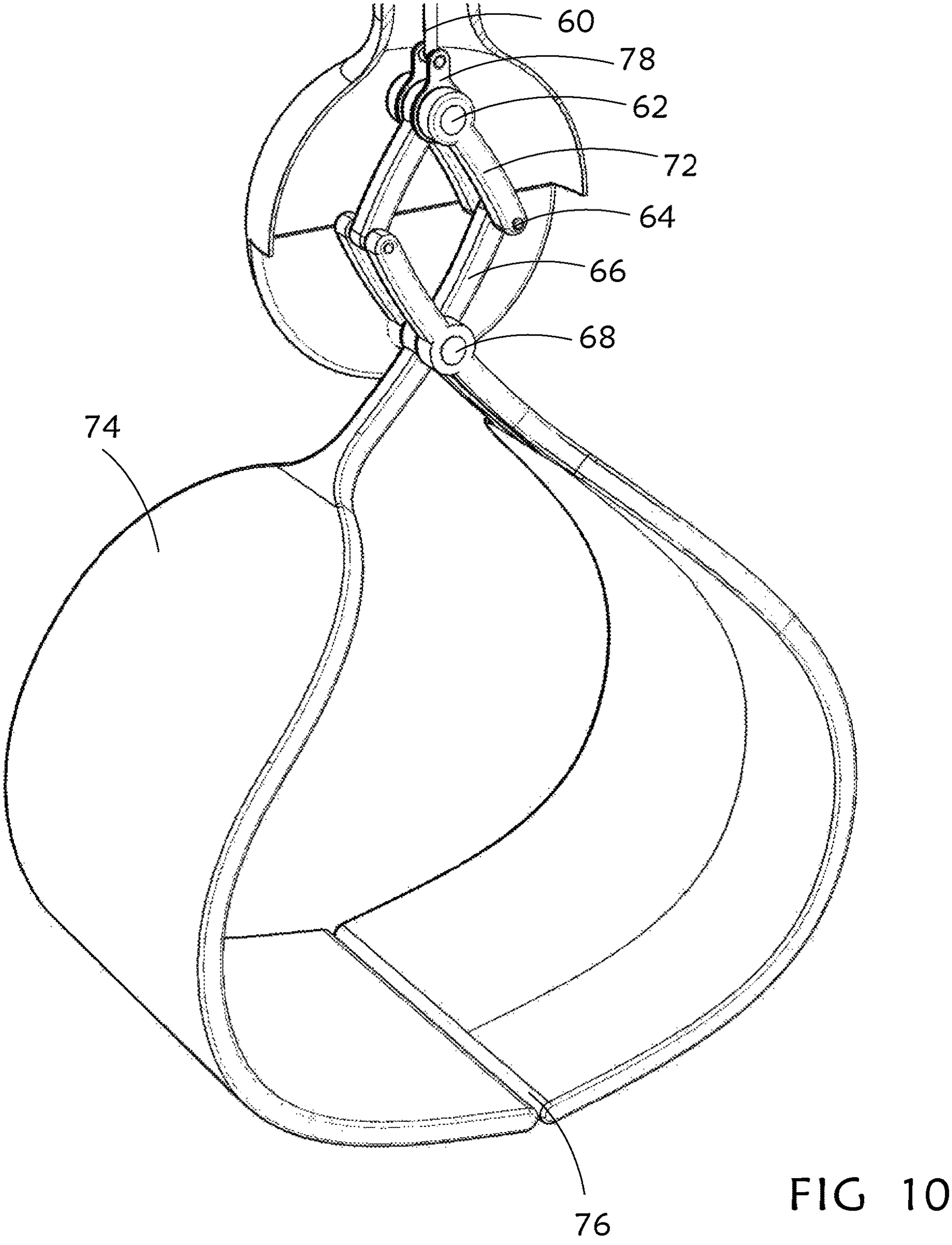
FIG. 10: Schematic illustration of an exemplary dog waste collector, according to an embodiment of the present invention.

FIG. 10 schematically illustrates the exemplary dog waste collector, according to an embodiment of the present invention. For example, shown in the figure is the collection mechanism in the closed configuration. A distal end of the inner rod (60) is attached by an element (78) to a hinge (62) to which are also attached arms (72), (66) attached by a hinge (64) to the shovel blades (74). The shovel blades (74) are attached together by a hinge (68). The shovel blades (74) include magnets (not shown) for collecting plastic bags with metallic components and a heating element (76) at the end of the blades to heat seal the bags closed.

Figure 11:
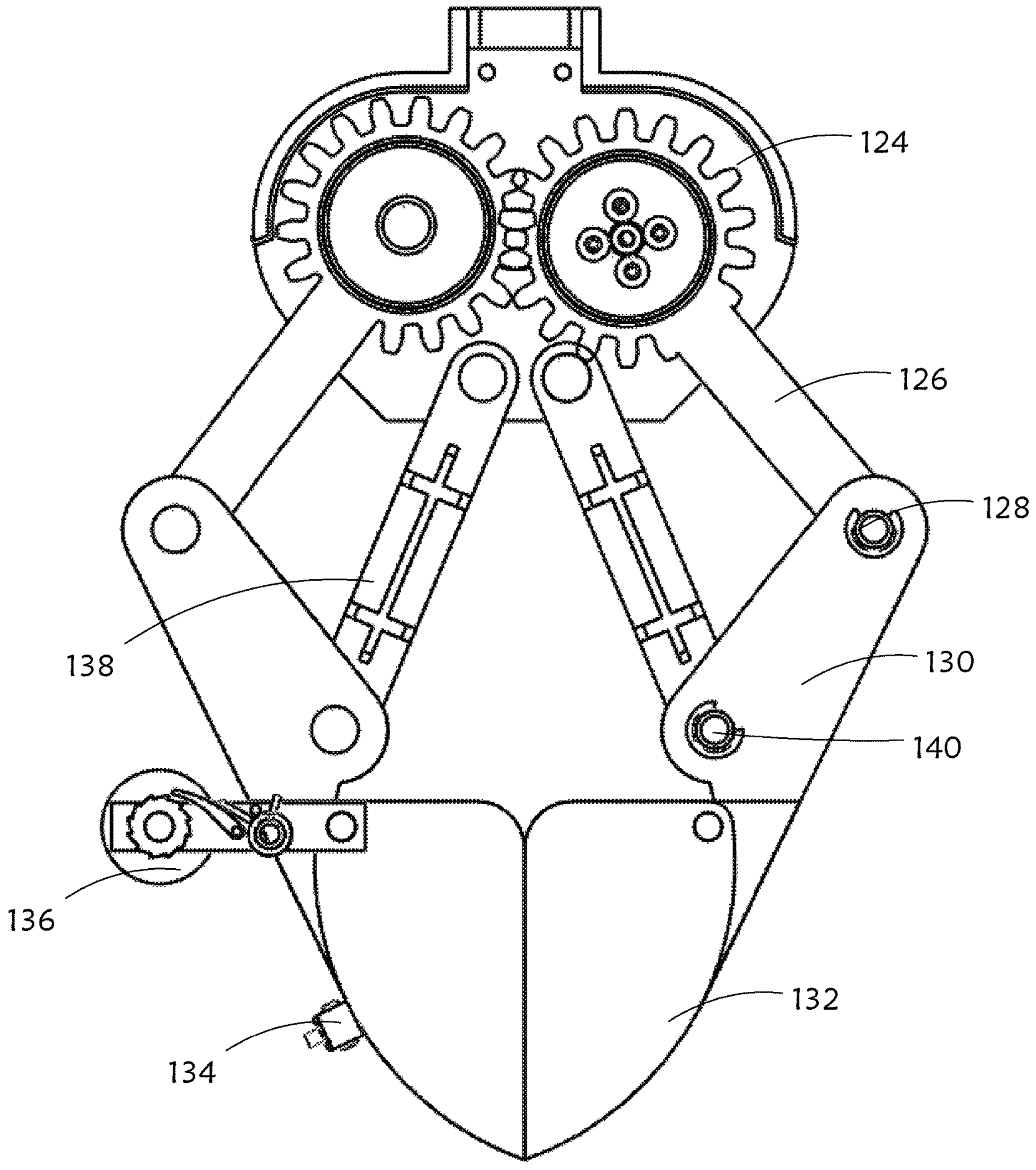
FIG. 11: Schematic illustration of an exemplary dog waste collector, according to an embodiment of the present invention.

FIG. 11: Schematic illustration of an exemplary dog waste collector, according to an embodiment of the present invention. In some embodiments, a claw for collecting waste and/or putting it in a bag (e.g., shovel blades (132)) is electrically actuated. Optionally, a system may include a bag dispenser (136). For example, shown in the figure is the collection mechanism in the closed configuration. The collection mechanism of FIG. 11 may be used with a handle as illustrated in the previous embodiments. For example, trigger 14 may include an electrical switch which may activate the electrical collection mechanism of FIG. 11. A distal end of the inner rod (not shown) is linked by an actuator (124) attached by an element (126) to a hinge (128) to which are also attached arms (130) attached by a hinge (140) to the shovel blades (132). The actuator (124) is further attached to arms (138) by a hinge (140). The shovel blades (132) optionally include a bag dispenser (136), and a sealing mechanism (134), e.g., magnets, adhesive dispenser, heating elements, etc. to seal the bags closed.

Figure 12:
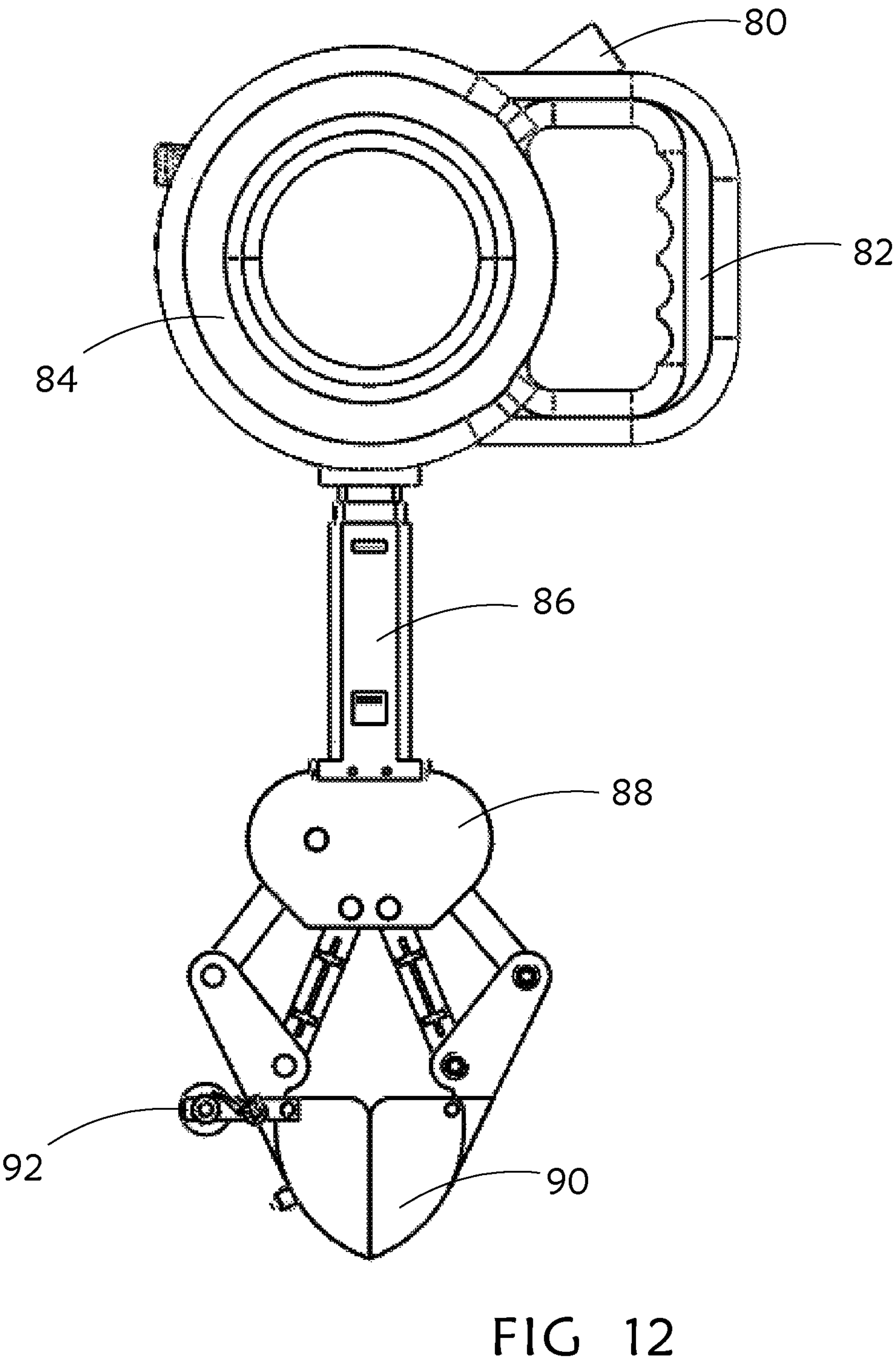
FIG. 12: Schematic illustration of an exemplary dog waste collector, according to an embodiment of the present invention.

FIG. 12: Schematic illustration of an exemplary dog waste collector, according to an embodiment of the present invention. For example, shown in the figure is the collection mechanism in the closed configuration. The collector includes a grip handle (82) with a trigger (80) used to operate the device, a retractable leash housing (84), a retracted telescopic rod (86) which includes at its distal end a collection mechanism (88) including collection shovel blades (90), and optionally a bag dispenser (92).

Figure 13:
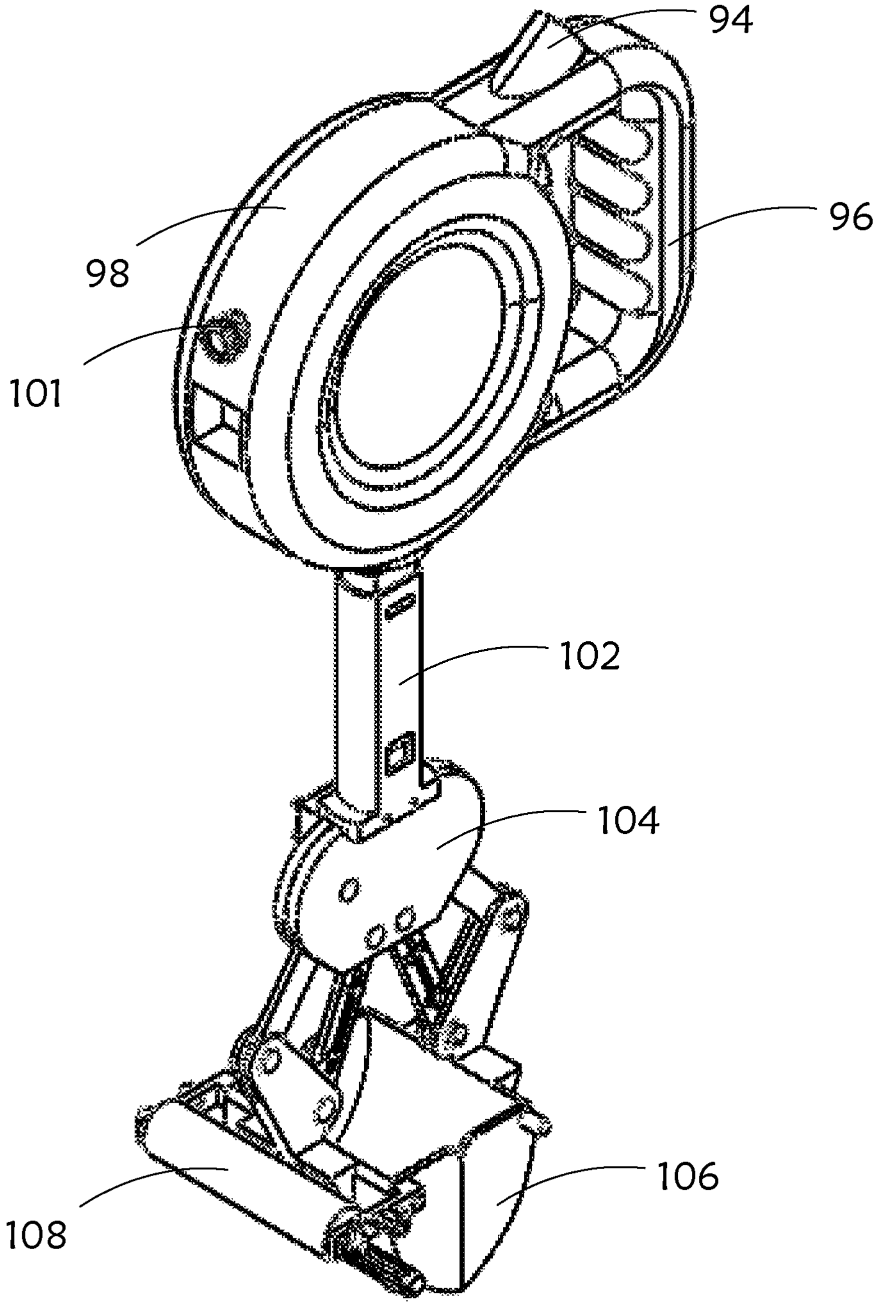
FIG. 13: Schematic illustration of an exemplary dog waste collector, according to an embodiment of the present invention.

FIG. 13: Schematic illustration of an exemplary dog waste collector, according to an embodiment of the present invention. For example, shown in the figure is the collection mechanism in the closed configuration. The collector includes a grip handle (96) with a trigger (94) used to operate the device, a retractable leash housing (98), optionally a cable (101), which is attachable to a dog collar, a retracted telescopic rod (102) which includes at its distal end a collection mechanism (104) including collection shovel blades (106), and optionally a bag dispenser (108). Optionally, the bag dispenser may dispense a strip of plastic from a long roll of plastic, and/or a plastic bag.

Figure 14:
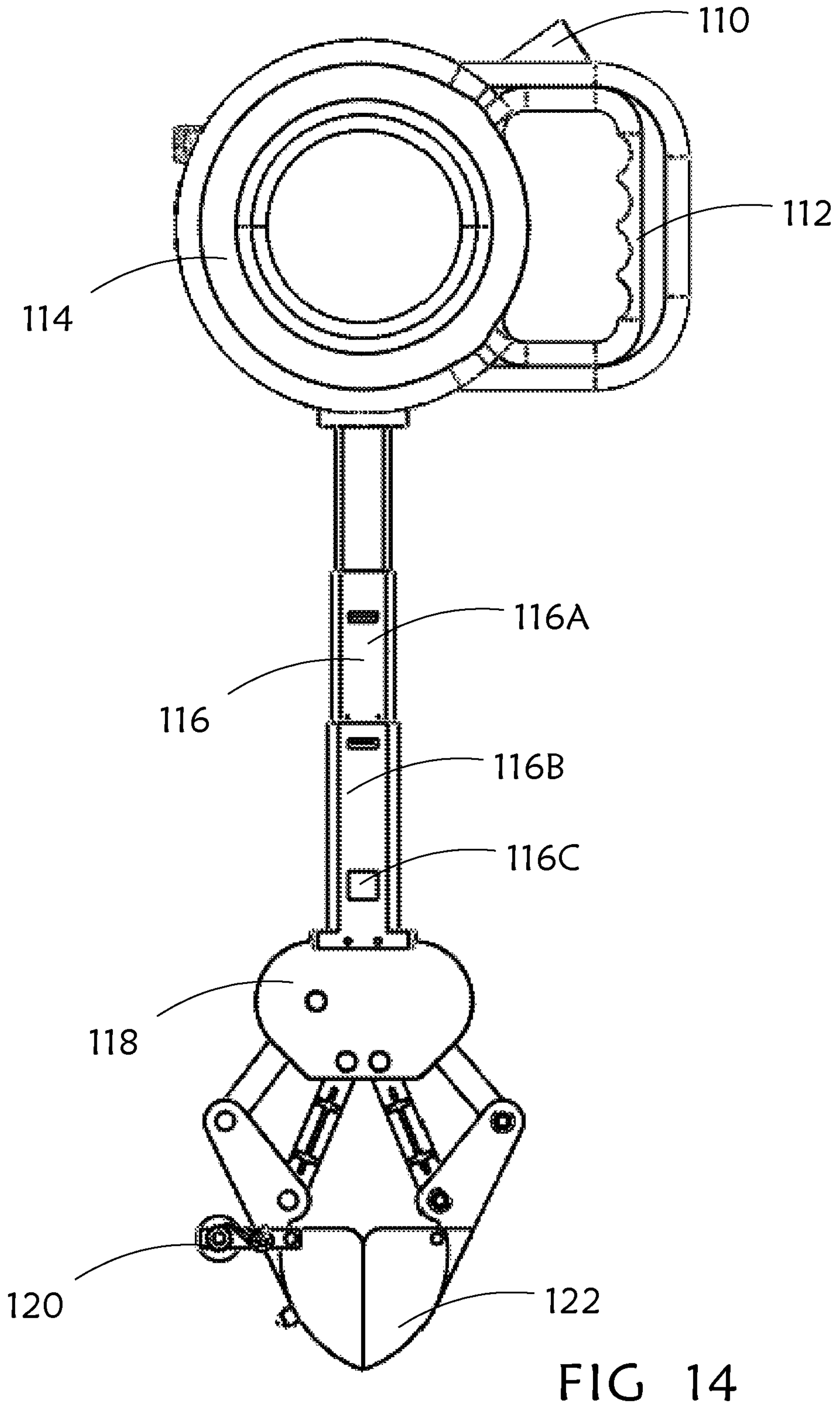
FIG. 14: Schematic illustration of an exemplary dog waste collector, according to an embodiment of the present invention.

FIG. 14: Schematic illustration of an exemplary dog waste collector, according to an embodiment of the present invention. For example, shown in the figure is the collection mechanism in the closed configuration. The collector includes a grip handle (112) with a trigger (110) used to operate the device, a retractable leash housing (114), an extended telescopic rod (116) which includes at its distal end a collection mechanism (118) including collection shovel blades (122), and optionally a bag dispenser (120). The telescopic rod (116) includes two extendable sections (116A, 116B) which may be secured in place by a locking means (116C).

Figure 15:
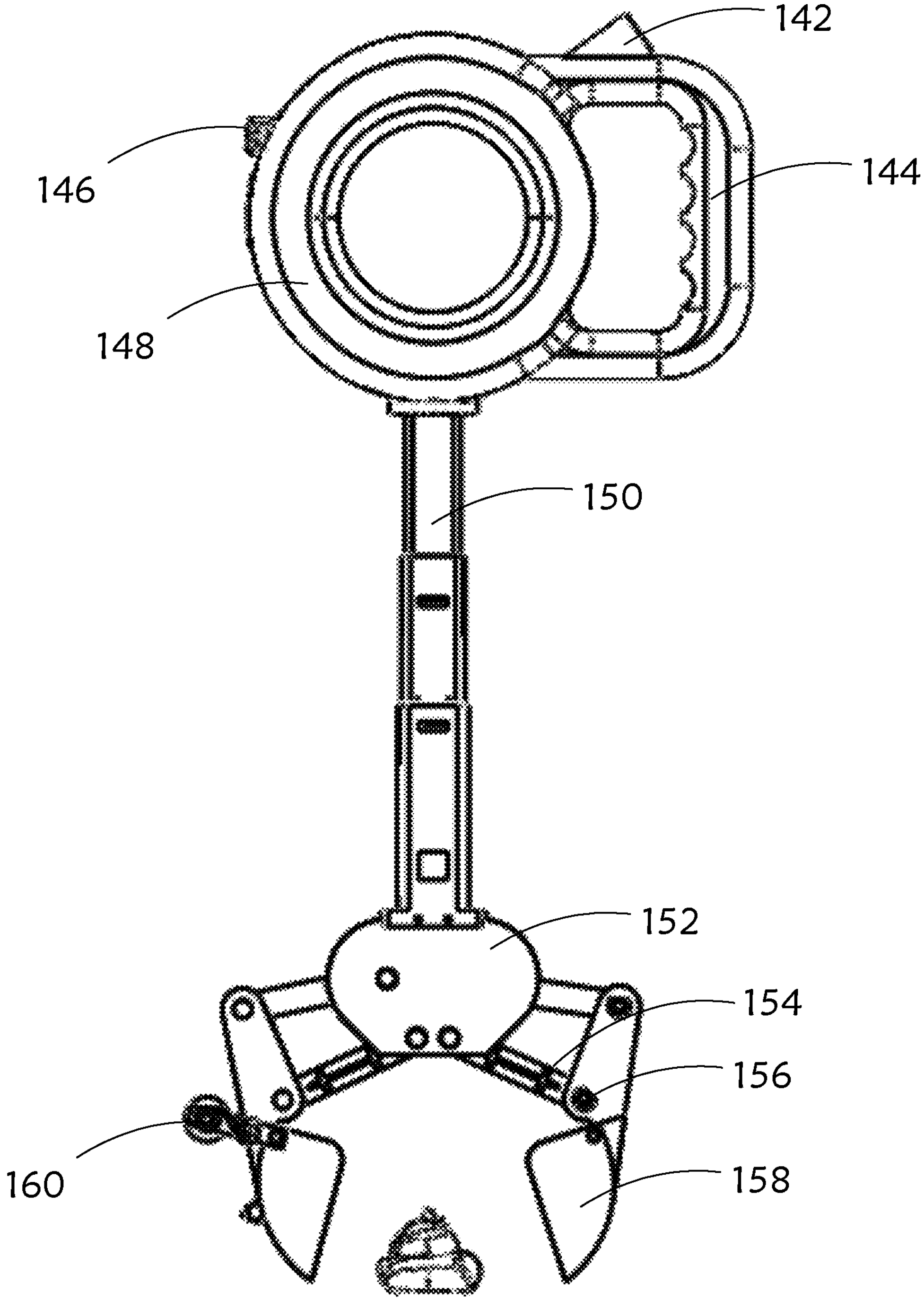
FIG. 15: Schematic illustration of an exemplary dog waste collector, according to an embodiment of the present invention.

FIG. 15: Schematic illustration of an exemplary dog waste collector, according to an embodiment of the present invention. For example, shown in the figure is the collection mechanism in the open configuration. The collector includes a grip handle (144) with a trigger (142) used to operate the device, a retractable leash housing (148) optionally a cable (146), which is attachable to a dog collar, an extended telescopic rod (150) which includes at its distal end a collection mechanism (152) including collection shovel blades (158), with one or more actuators (154) attached to the shovel blades by hinges (156), and optionally a bag dispenser (160).

Figure 16:
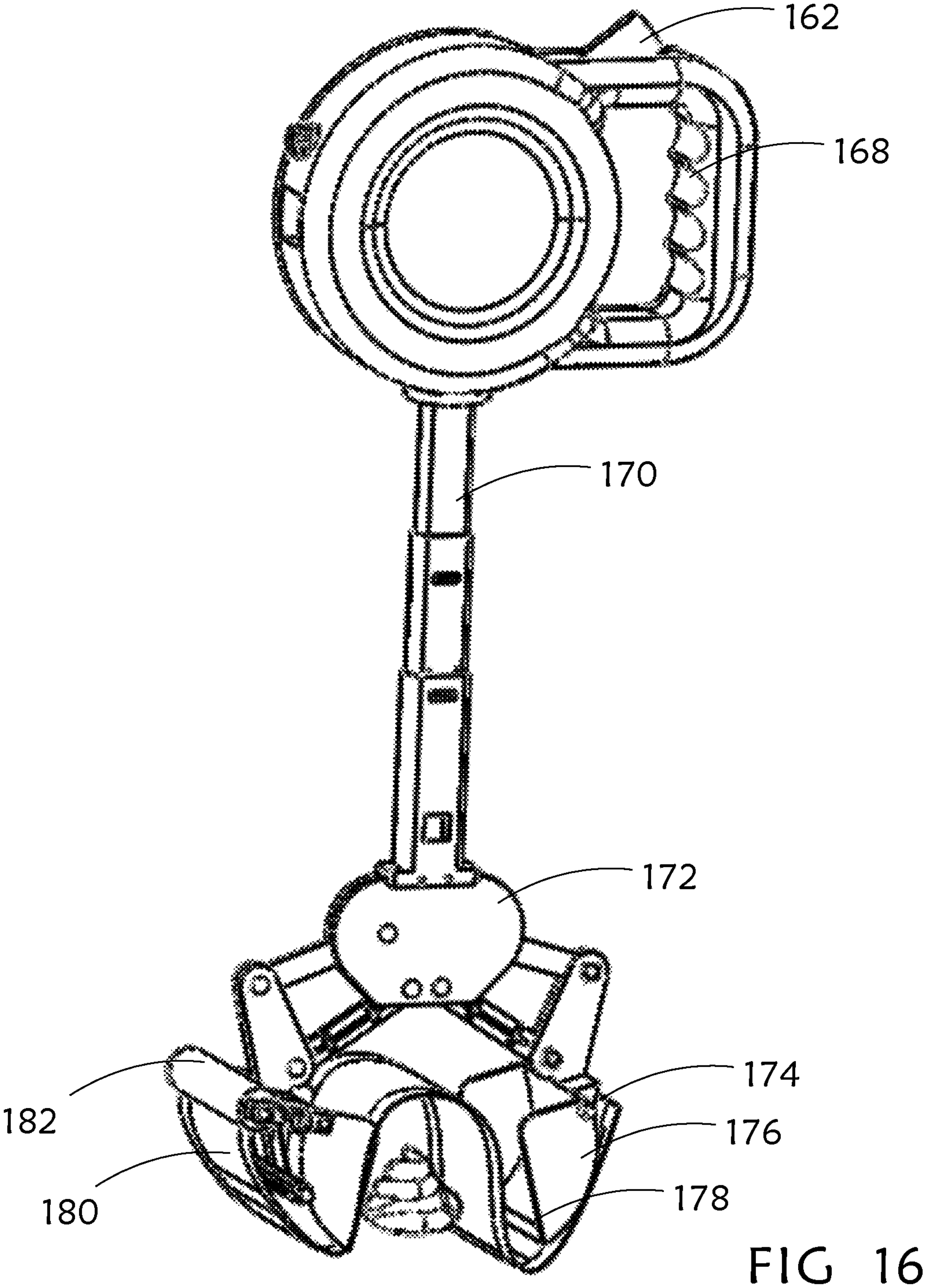
FIG. 16: Schematic illustration of an exemplary dog waste collector, according to an embodiment of the present invention.

FIG. 16: Schematic illustration of an exemplary dog waste collector, according to an embodiment of the present invention. For example, shown in the figure is the collection mechanism in the open configuration. The collector includes a grip handle (168) with a trigger (162) used to operate the device, an extended telescopic rod (170) which includes at its distal end a collection mechanism (172) including collection shovel blades (176), and a bag dispenser (182). Optionally, the bag dispenser (182) may dispense a strip of plastic (180) from a long roll of plastic, and/or a plastic bag. The plastic strip and/or plastic bag are attached to the shovel blade using an interference element (174) and stretched open when the collection mechanism in the open configuration. The shovel blades (176) include a sealing mechanism, such as heating elements a heating element (178) at the edge of the shovel blades to cut and/or heat seal the bags closed.

Figure 17:
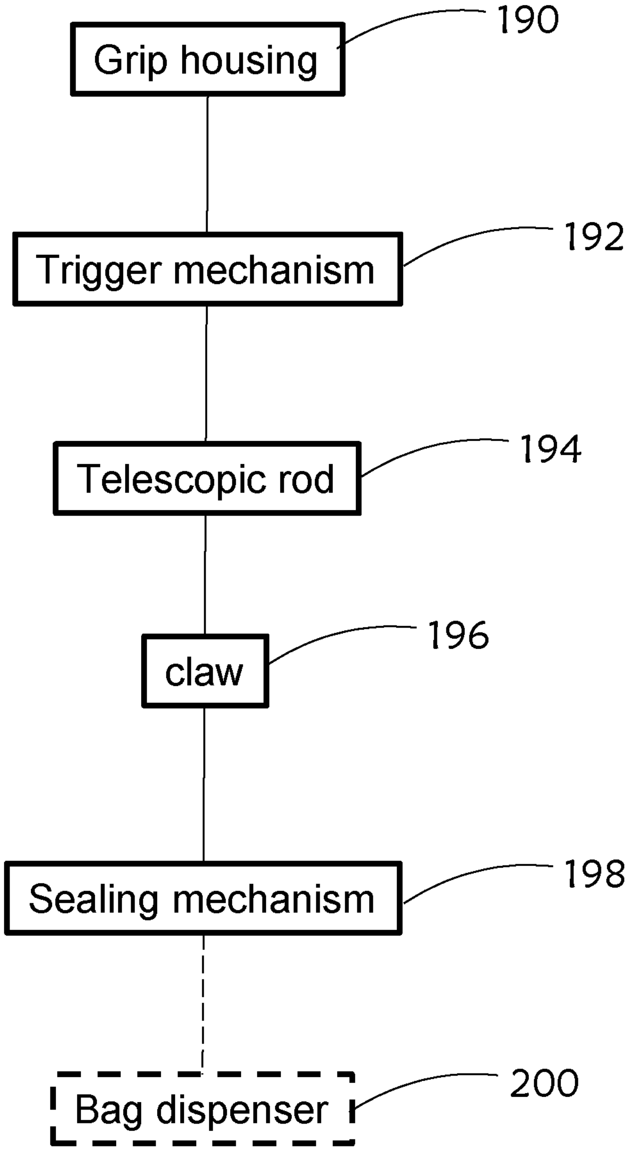
FIG. 17: A block diagram illustrating an embodiment of the current invention.

FIG. 17: A block diagram illustrating an embodiment of the current invention. For example, the device includes a grip housing (190) attached to the proximal end of a telescopic rod (194), which is attached to claw (196) (e.g. shovel blades) at a distal end, wherein the claw is configured to be opened and closed responsive to activation of the trigger mechanism (192) positioned on the grip handle. Optionally, the device includes a bag dispenser (200) and/or a sealing mechanism (198).

Figure 18:
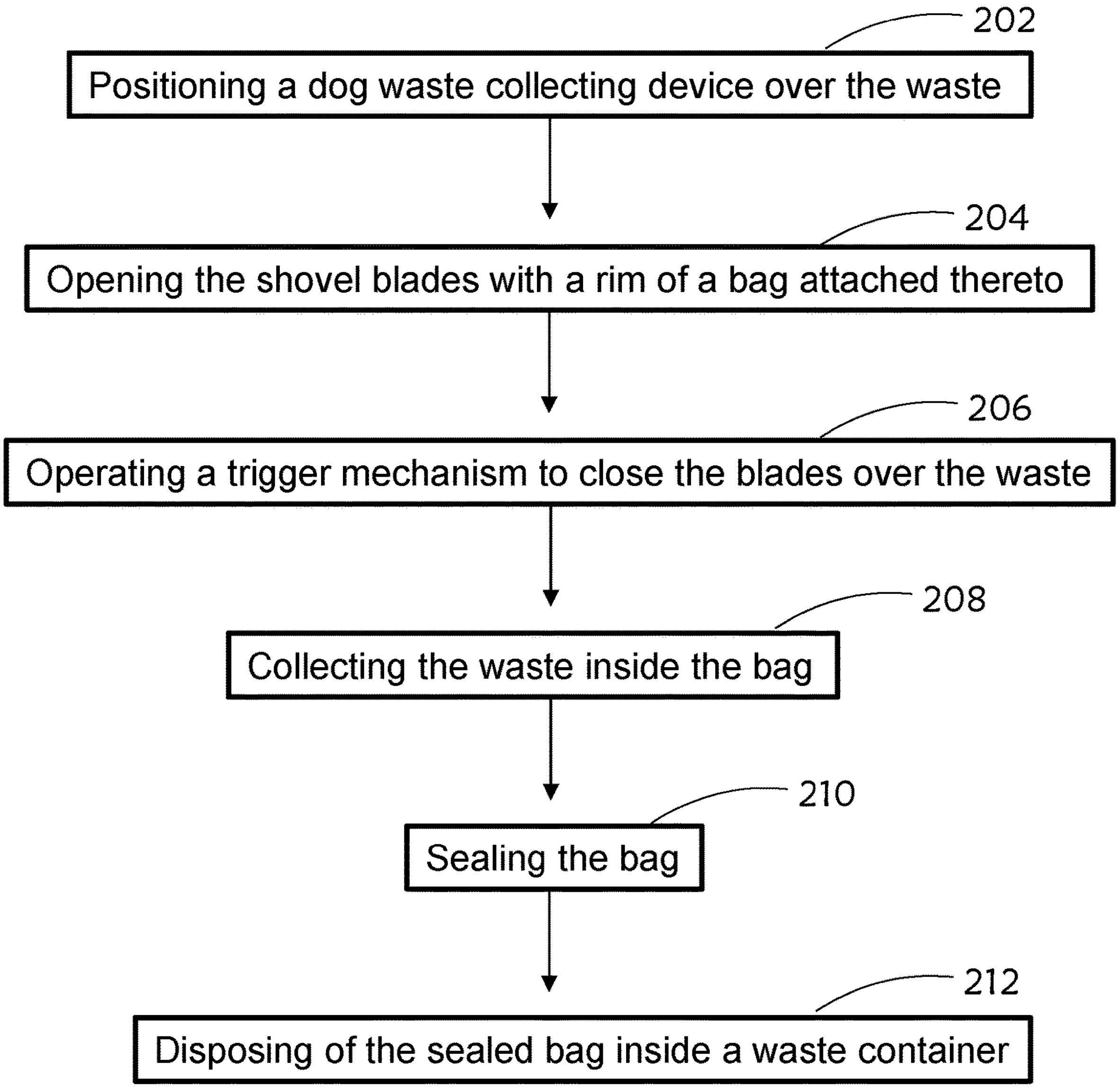
FIG. 18: A flow chart illustrating an embodiment of the current invention.

FIG. 18: A flow chart illustrating an embodiment of the current invention. For example, the method includes positioning (202) a dog waste collecting device over the waste, opening (204) the shovel blades with a rim of a bag attached to the shovel blades, operating (206) a trigger mechanism to close the blades over the waste, thereby collecting (208) the waste inside the bag, sealing (210) the bag, and disposing (212) of the sealed bag inside a waste container by opening the shovel blades. Optionally, a new bag is automatically loaded to the shovel blades, for example, using a dispenser.

General

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

It is expected that during the life of a patent maturing from this application many relevant building technologies, artificial intelligence methodologies, computer user interfaces, image capture devices will be developed and the scope of the terms for design elements, analysis routines, user devices is intended to include all such new technologies a priori.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As used herein the term “about” refers to ±10%

The terms “comprises”, “comprising”, “includes”, “including”, “having” and their conjugates mean “including but not limited to”.

The term “consisting of” means “including and limited to”.

The term “consisting essentially of” means that the composition, method or structure may include additional ingredients, steps and/or parts, but only if the additional ingredients, steps and/or parts do not materially alter the basic and novel characteristics of the claimed composition, method or structure.

As used herein, the singular form “a”, “an” and “the” include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases “ranging/ranges between” a first indicate number and a second indicate number and “ranging/ranges from” a first indicate number “to” a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed:

1. A device for collecting dog waste, comprising:

a grip handle; and a rod with a proximal portion of the rod attached to the grip handle;

a claw attached to distal portion of the rod, wherein the claw includes shovel blades, wherein the shovel blades wherein the shovel blades comprise magnets which attract a magnetic material arranged around a rim of a dog waste collection bag;

wherein the claw is configured to be opened and closed responsive to activation of a trigger mechanism positioned on the grip handle.

2. The device of claim 1, wherein the rod is telescopic.

3. The device according to claim 1, wherein the shovel blades include one or more heating elements configured to heat seal a rim of a bag following collection of the waste.

4. The device according to claim 3, wherein heating elements are located at an edge of each shovel blade.

5. The device according to claim 1, further comprising a bag dispenser.

6. The device according to claim 5, wherein the bag dispenser is configured to dispense a dog waste collection bag, wherein the dog waste collection bag is a plastic bag or a foldable strip of plastic from a long roll of plastic.

7. The device according to claim 6, wherein the dog waste collection bag is composed of nylon, polypropylene, polyethylene, or combinations thereof.

8. The device according to claim 1, wherein the rod is telescopic and comprises at least one extendable section which are secured in place by a locking means.

9. The device according to claim 1, wherein the grip handle further comprises a leash attachable to a collar of a dog.

10. The device according to claim 9, wherein the leash is retractable.

11. A method for collecting dog waste, comprising:

positioning a dog waste collecting device over the waste, wherein the dog waste collection device comprises:

a grip handle; and a rod attached to the grip handle at a proximal end and to a claw at a distal end, wherein the claw is configured to be opened and closed responsive to activating a trigger mechanism positioned on the grip handle; and opening the claw with a rim of a dog waste collection bag attached to the claw;

operating a trigger mechanism to close the claw over the waste, thereby collecting the waste inside the dog waste collection bag;

sealing the dog waste collection bag, wherein the sealing is by one or more heating elements located at an edge of the claw configured to heat seal the rim of the dog waste collection bag following collection of the waste; and disposing of the sealed dog waste collection bag inside a waste container by opening the claw.

12. The method of claim 11, wherein the rod is telescopic.

13. The method according to claim 9, wherein the activating is mechanical or electronic.

14. The method according to claim 11, further comprising attaching the dog waste collection bag to the claw is by dispensing from a bag dispenser.

15. The method according to claim 14, wherein the bag dispenser is configured to dispense a dog waste collection bag, wherein the dog waste collection bag is a plastic bag or a foldable strip of plastic from a long roll of plastic.

16. The method according to claim 11, wherein the positioning comprises extending at least one extendable section of the rod is telescopic and securing the at least one extended section in place by a locking means.

* * * * *